(12) United States Patent
Thomas, III et al.

(10) Patent No.: US 11,356,494 B2
(45) Date of Patent: Jun. 7, 2022

(54) MANAGING NETWORK ISOLATED SERVICES FROM A PUBLICLY HOSTED WEB APPLICATION VIA CORS

(71) Applicant: NetApp, Inc., Sunnyvale, CA (US)

(72) Inventors: Joseph Ray Thomas, III, Boulder, CO (US); John Mears, Arvada, CO (US); Nathan Hammernik, Boulder, CO (US)

(73) Assignee: NetApp, Inc., San Jose, CA (US)

( * ) Notice: Subject to any disclaimer, the term of this patent is extended or adjusted under 35 U.S.C. 154(b) by 183 days.

(21) Appl. No.: 16/857,460

(22) Filed: Apr. 24, 2020

(65) Prior Publication Data

US 2021/0337008 A1 Oct. 28, 2021

(51) Int. Cl.
| | |
|---|---|
| *H04L 67/02* | (2022.01) |
| *H04L 101/659* | (2022.01) |
| *G06F 9/54* | (2006.01) |
| *H04L 9/40* | (2022.01) |
| *G06F 9/451* | (2018.01) |
| *H04L 61/2514* | (2022.01) |

(52) U.S. Cl.
CPC .............. *H04L 67/02* (2013.01); *G06F 9/451* (2018.02); *G06F 9/547* (2013.01); *H04L 61/2514* (2013.01); *H04L 61/6059* (2013.01); *H04L 63/02* (2013.01)

(58) Field of Classification Search
None
See application file for complete search history.

(56) References Cited

U.S. PATENT DOCUMENTS

| | | | | |
|---|---|---|---|---|
| 9,332,090 | B1 * | 5/2016 | Fallows | H04L 69/04 |
| 10,581,871 | B1 * | 3/2020 | Dehoumon | H04L 63/10 |
| 2010/0281107 | A1 * | 11/2010 | Fallows | H04L 5/16 715/760 |
| 2014/0007187 | A1 * | 1/2014 | Harrison | H04N 21/6175 726/1 |
| 2017/0171157 | A1 * | 6/2017 | Hristov | H04L 63/10 |
| 2017/0346830 | A1 * | 11/2017 | Goldfarb | H04L 63/102 |
| 2021/0075832 | A1 * | 3/2021 | Bisztrai | H04L 65/1069 |

\* cited by examiner

*Primary Examiner* — Lashonda Jacobs-Burton
(74) *Attorney, Agent, or Firm* — Jaffery Watson Mendonsa & Hamilton LLP (57) ABSTRACT

A technique implements an administrative user interface of a backend service used to manage and administer on-premises resources, such as storage nodes of a cluster, within a private customer network. The backend service includes a browser configured to issue cross-origin resource sharing (CORS) requests among target storage nodes and a publicly-hosted web application on remote computing systems accessed via a public computer network (i.e., internet) that can be loaded on the browser within the customer network to manage and administer the on-prem resources on the private network. The technique involves the use of CORS over HyperText Transfer Protocol to access an origin that is not reachable via the public internet from a predetermined location of the browser, e.g., within the same customer network as the target storage nodes, particularly to facilitate management of the nodes.

20 Claims, 4 Drawing Sheets

MANAGING NETWORK ISOLATED SERVICES FROM A PUBLICLY HOSTED WEB APPLICATION VIA CORS

BACKGROUND

Technical Field

The disclosure generally relates to storage nodes of a storage cluster and, more specifically, to user interface (UI) software used to manage and administer a storage cluster of storage nodes.

Background Information

Management and administration of on-premises ("on-prem") hardware resources, e.g., a storage cluster having a plurality of storage nodes, of a private data center in a secure manner may involve feature enhancements on virtualized remote computing systems ("cloud") consumed over a public computer network, such as the internet. The features may be remotely accessed from applications publicly hosted on the cloud by a cloud provider via a web browser with an ability to communicate directly with and manage the software running on the storage cluster. The features may include additional or enhanced software functionality to, e.g., user interface (UI) software delivered to the web browser for communication with and management of on-prem software. Such feature update may be generally difficult to provide because "south-bound" communication between the cloud provider and the web browser, while originating requests to the on-prem software running within a customer network, is typically blocked by a firewall. As a result, the on-prem software requires a manual upgrade process to better distribute new UI features and fixes.

Obviating the difficulty in providing such south-bound communication feature update typically requires a customer to open the firewall to allow issuance of requests outside the customer network, which may have negative security implications.

Therefore, an underlying problem involves a communication challenge between publicly hosted applications (e.g., administration applications) and storage cluster resources that exist within private customer networks. Most networks are configured with a firewall that blocks inbound traffic from the public internet to restrict the ability of a publicly hosted web application to push updates/fixes to the resources. A common workaround for this limitation is to tightly-couple the management software to the resources and host the software directly on the resources. Yet this solution has many drawbacks including the inability to push software updates (including UI management-only updates) on demand.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

The embodiments described herein are directed to a technique configured to implement a web browser-based administrative user interface (UI) for a backend service used to manage and administer on-premises ("on-prem") resources, such as storage nodes of a storage cluster, within a private customer network (i.e., having private internet addresses according to Internet Engineering Task Force RFC 1918). The on-prem backend service resides on the private customer network and is configured to respond to cross-origin resource sharing (CORS) requests from the web browser (e.g., a publicly hosted web application loaded on the browser) running on a local computing system accessing a public computer network (i.e., internet). That is, the publicly hosted website serves the web application (e.g., UI such as hypertext markup language pages or scripts) to the (local) web browser with instructions to perform CORS requests to the on-prem backend service on the private customer network.

The technique involves the use of CORS over HyperText Transfer Protocol (HTTP) to access an origin, i.e., the on-prem backend service, that is not otherwise reachable via the public internet (e.g., is on a network with private internet addressing). In this manner, a CORS request from the browser may target private network addresses of the storage nodes as if originating from the publicly available internet addresses so as is to administer the on-prem resources. Specifically, the web application is configured to instruct the web browser to perform CORS requests to the private customer network, bypassing browser domain name verification of the private internet addresses of the on-prem resources for the CORS requests. That is, the typical CORS request domain name service (DNS) verification enforced in web browsers is bypassed by customizing the web application for the customer's private network. As such, the publicly hosted web application may instruct a web browser on a private network to perform CORS requests accessing resources on the private network.

In an embodiment, the technique may implement the web application having client and server-type components. The server component resides on each storage node within the customer network and exposes software resources of the node via an application programming interface (API). The server component is further configured to accept CORS requests from a web browser within the customer network executing the client component of the web application hosted at a public location, e.g., the remote computing systems ("cloud") consumed over the public internet. The client component is hosted at the public location and configured to prompt a user for a network (e.g., Internet Protocol, IP) address of the on-prem resource, e.g., a target storage node having a private IP address accessible to the browser executing the client component. A user using the browser requests the client component of the application from the public location, which loads it into the browser, and enters the IP address of the on-prem resource (e.g., the storage node) in response to a client component prompt. The client component is thus configured with the information required to construct cross-origin HTTP requests to private IP addresses of the on-prem resources so as to manage and access the server component(s), e.g., the target storage node via the API. In this manner, a publicly (cloud) hosted web application may be configured to administer on-prem resources accessible on a private network using dynamically configured CORS requests to access origin locations (i.e., target IP addresses) on the private network.

DESCRIPTION

Figure 1:
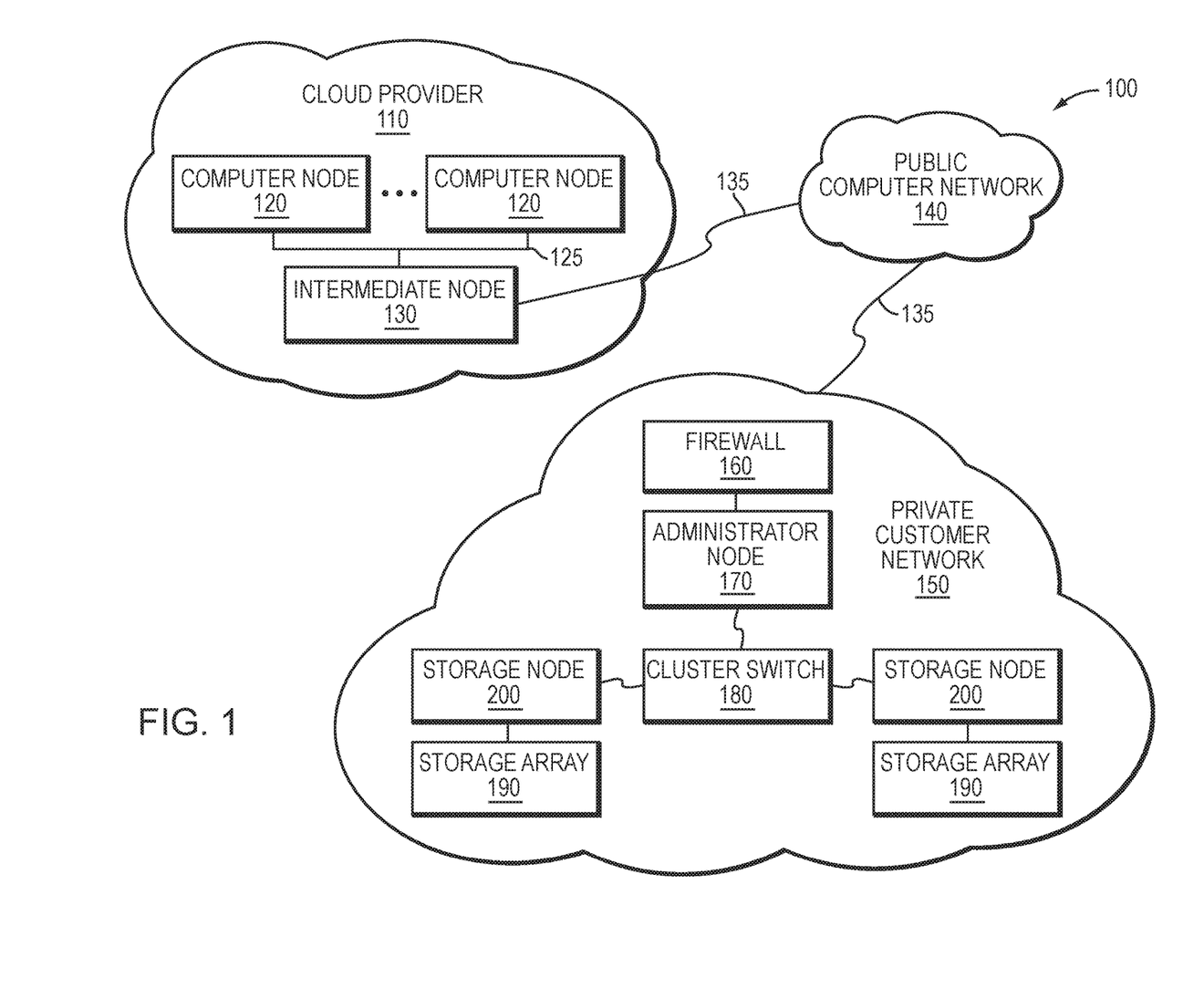
FIG. 1 is a block diagram of a computing environment having virtualized remote computing systems connected to a private customer network via a public computer network.

FIG. 1 is a block diagram of a computing environment 100 having virtualized is remote computing systems connected to a private customer network 150 via a public computer network 140. The virtualized remote computing systems are illustratively embodied as one or more computer nodes 120 and intermediate nodes 130 of a cloud provider 110 deployed as a public "cloud" such as, e.g., with deployments from Amazon Web Services (AWS), Google Cloud Services, Microsoft Azure, or VMWare vCloud. The cloud provider 110 may be configured to provide virtualized resources, such as virtual storage, network, and/or compute resources that are accessible over the public computer network 140, such as the Internet. Each computer node 120 is illustratively embodied as a computer system having interconnected processor(s), main memory, storage adapter(s), and network adapter(s). The network adapter connects the computer node 120 to other computer nodes 120 of the cloud provider 110 over local network segments 125 illustratively embodied as shared local area networks (LANs) or virtual LANs (VLANs).

The intermediate node 130 may be embodied as a network switch, router, or virtual private network (VPN) gateway that interconnects the LAN/VLAN local segments 125 with remote network segments 135 illustratively embodied as point-to-point links, wide area networks (WANs), and/or VPNs implemented over the public network 140, such as the internet, and further connect to a private customer network 150.

Communication over the network segments 125, 135 may be effected by exchanging discrete frames or packets of data according to pre-defined protocols, such as the Transmission Control Protocol/Internet Protocol (TCP/IP) and the OpenID Connect (OIDC) protocol, although other protocols, such as the User Datagram Protocol (UDP) or the HyperText Transfer Protocol Secure (HTTPS) may also be advantageously employed.

The private customer network 150 includes an administrator node 170 interconnected with a plurality of storage nodes 200 organized as a storage cluster. The administrator node 170 provides secure, on-premises management of the storage cluster and, to that end, is connected to the public network 140 via a firewall 160 configured to is provide packet filtering services, such as blocking ingress or egress packets received or transmitted over the public network, packet spoof detection, and IP address blacklisting, for security within the private network 150. The storage nodes 200 may be interconnected by a cluster switch 180 and include functional components that cooperate to provide a distributed, scale-out storage architecture of the storage cluster. The components of each storage node 200 include hardware and software functionality that enable the node to connect to and service one or more clients over the public computer network 140, as well as to a storage array 190 of storage devices, to thereby render the storage service in accordance with the distributed storage architecture.

Figure 2:
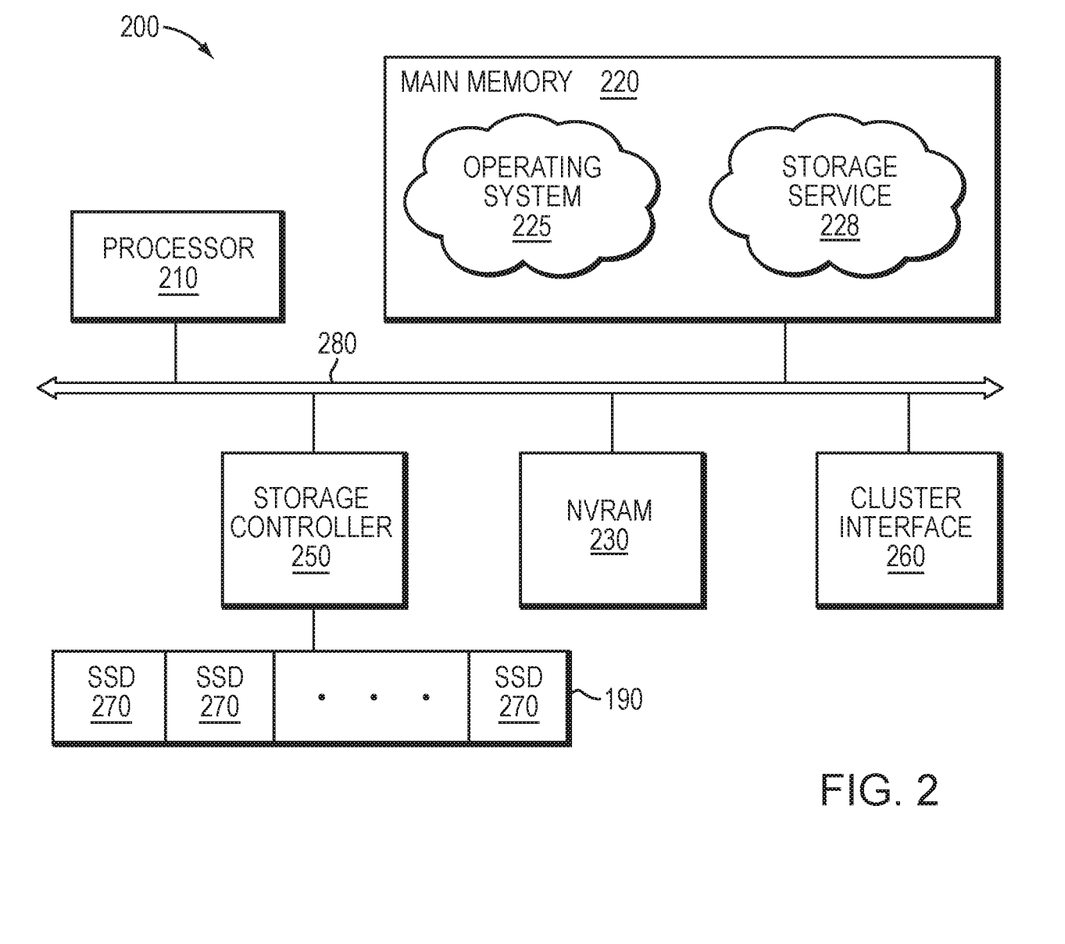
FIG. 2 is a block diagram of a storage node of the private customer network.

FIG. 2 is a block diagram of storage node 200 illustratively embodied as a computer system having one or more processing units (processors) 210, a main memory 220, a non-volatile random access memory (NVRAM) 230, one or more storage controllers 250 and a cluster interface 260 interconnected by a system bus 280. The main memory 220 may include memory locations that are addressable by the processor 210 for storing software programs and data structures associated with the embodiments described herein. The processor 210 may, in turn, include processing elements and/or logic circuitry configured to execute the software programs, such as applications of a storage service 228, and manipulate the data structures.

An operating system 225, portions of which are typically resident in memory 220 (in-core) and executed by the processing elements (e.g., processor 210), functionally organizes the storage node by, inter alia, invoking operations in support of the storage service 228 implemented by the node. A suitable operating system 225 may include a general-purpose operating system, such as the UNIX® series or Microsoft Windows® series of operating systems, or an operating system with configurable functionality such as microkernels and embedded kernels. However, in an embodiment described herein, the operating system is illustratively the Linux® operating system. It will be apparent to those skilled in the art that other processing and memory means, including various computer readable media, may be used to store and execute program instructions pertaining to the embodiments herein.

The storage controller 250 cooperates with the storage service 228 implemented on the storage node 200 to access information requested by the client. The information is preferably stored on storage devices such as solid state drives (SSDs) 270, illustratively embodied as flash storage devices, of storage array 190. In an embodiment, the flash storage devices may be block-oriented devices (i.e., drives accessed as blocks) based on NAND flash components, e.g., single-level-cell (SLC) flash, multi-level-cell (MLC) flash or triple-level-cell (TLC) flash, although it will be understood to those skilled in the art that other block-oriented, non-volatile, rotating media storage devices (e.g., hard disk drives) and solid-state electronic devices (e.g., drives based on storage class memory components) may be advantageously used with the embodiments described herein. The storage controller 250 may include one or more ports having I/O interface circuitry that couples to the SSDs 270 over an I/O interconnect arrangement, such as a conventional serial attached SCSI (SAS) and serial ATA (SATA) topology.

The cluster interface 260 may include one or more ports adapted to couple the storage node 200 via the cluster switch 180 to the other node(s) of the storage cluster. In an embodiment, dual 10 Gbps Ethernet ports may be used for internode communication, although it will be apparent to those skilled in the art that other types of protocols and interconnects may be utilized within the embodiments described herein. The NVRAM 230 may include a back-up battery or other built-in last-state retention capability (e.g., non-volatile semiconductor memory such as storage class memory) that is capable of maintaining data in light of a failure to the storage node and cluster environment.

The embodiments described herein are directed to a technique configured to implement a web browser-based administrative UI for a backend service used to manage and administer on-prem resources, such as storage nodes of a storage cluster, within a private customer network. The on-prem backend service resides on the private customer network 150 and is configured to respond to cross-origin resource sharing (CORS) requests from the web browser (e.g., a publicly hosted web application loaded on the browser) running on a local computing system (e.g., the administrator node 170) accessing a public computer network (i.e., internet). That is, a publicly hosted website serves the web application (e.g., UI such as hypertext markup language pages or scripts) to the (local) web browser with instructions to perform CORS requests to the on-prem backend service on the private customer network 150.

The technique involves the use of CORS over HyperText Transfer Protocol (HTTP) to access an origin, i.e., the on-prem backend service, that is not otherwise reachable via the public internet (e.g., is on a network with private internet addressing according to Internet Engineering Task Force RFC 1918). Although CORS over HTTP is typically employed to share resources between two verified entities in a secure manner (i.e., internet address verification via dynamic name service and cryptographic certificates), the technique described herein involves an implementation where the origin from which the resources are requested, e.g., the target storage nodes, is not known until application runtime configured according to information provided by a customer. That is, the CORS request is configured with an IP address provided by a user. In this manner, the CORS request from the browser may target private network addresses of the storage nodes as if originating from the publicly available internet addresses so as to administer the on-prem resources. Specifically, the web application is configured to instruct the web browser to perform CORS requests to the private customer network, bypassing browser domain name verification of the private internet addresses of the on-prem resources for the CORS requests. That is, the typical CORS request domain name service (DNS) verification enforced in web browsers is bypassed by customizing the web application for the customer's private network. As such, the publicly hosted web application may instruct a web browser on a private network to perform CORS requests accessing resources on the private network.

Figure 3:
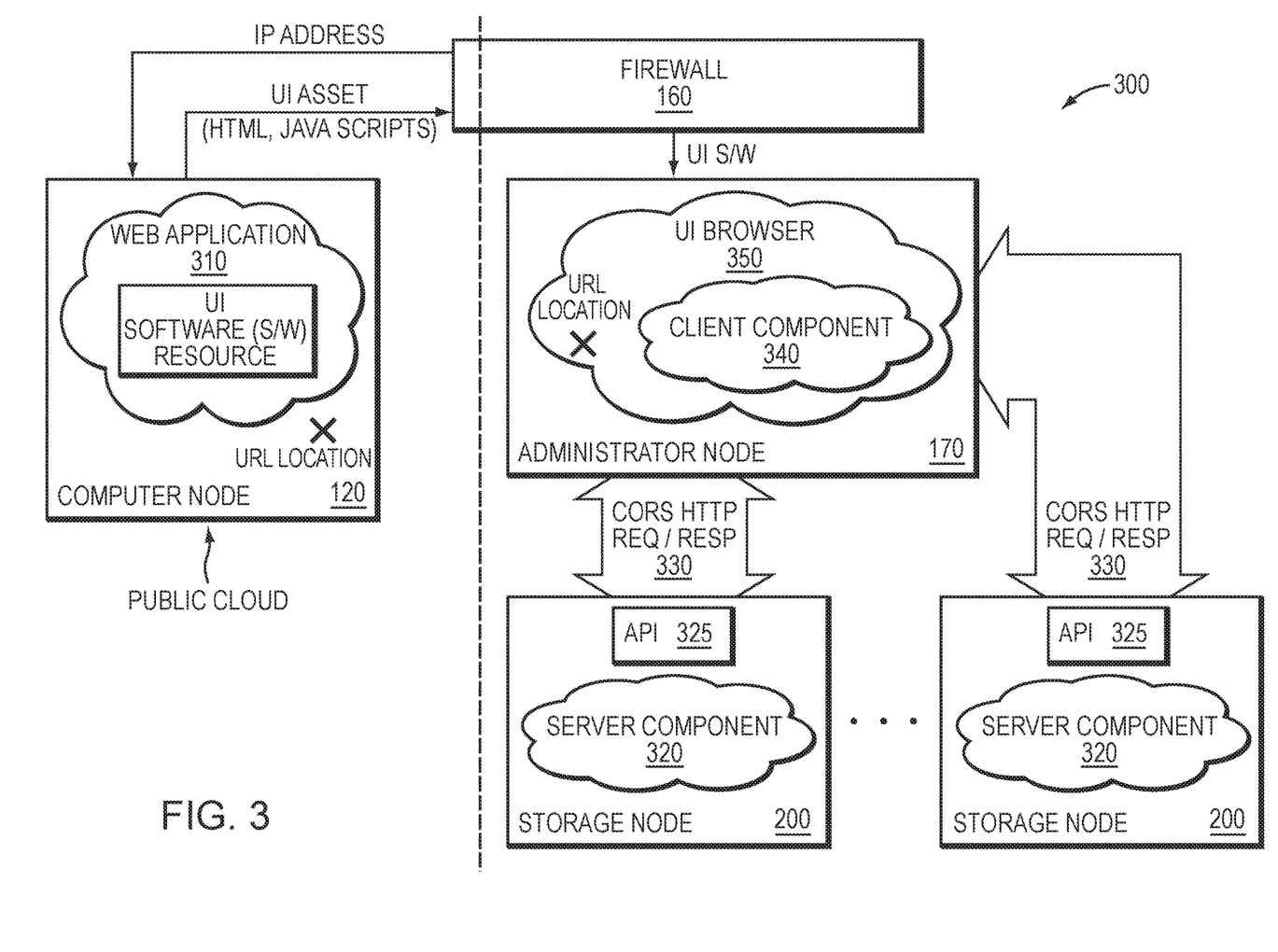
FIG. 3 is a block diagram of a backend service configured to process cross-origin resource sharing (CORS) requests.

FIG. 3 is a block diagram of the backend service 300 configured to process CORS requests according to the technique described herein. In an embodiment, the technique may implement the web application 310 provided from one or more computer nodes 120 of cloud provider 110, wherein the web application 310 includes browser-based client and server-type components. The server component 320 resides on each storage node 200 within the customer network 150 and exposes software resources (i.e., on-prem resources) of the node via an application programming interface (API) 325. The server component 320 is further configured to accept, process and provide CORS HTTP responses 330 for software resources requested by a web browser 350 executing the client component 340 issued to a public uniform resource locator (URL) location X, e.g., a web address X on the remote computing systems ("cloud") consumed over the public internet, and cross-originating to the server component 320.

The client component 340 of the web application 310 is initially hosted at the public location X and is configured (e.g., scripted) to prompt a user for a private network (e.g., Internet Protocol, IP) address (e.g., IP addresses according to Internet Engineering Task Force RFC 1918) of the storage node 200 accessible to the browser 350. Note that the private network address may also be a private IP version 6 (IPv6) address according to RFC 4193. In a further embodiment, the private network address may be an IPv6 address which is publicly reachable (i.e., routable through the firewall), but has no public DNS entry (i.e., lacks a public DNS record).

A user requests the client component 340 of the application 310 from the public URL location X, loads it into the browser 350 and enters the private IP address of the storage node 200 in response to a client component prompt. The client component 340 of the browser 350 is thus configured with the information required to construct CORS HTTP requests 330 to the private IP address of the storage node 200 so as to manage and access the services (i.e., on-prem resource) of the storage node 200 within the customer network 150 via the API 325. In this manner, a publicly hosted web application may be configured to administer on-prem resources accessible on a private network using a dynamically configured CORS request to access origin locations (i.e., target IP addresses) on the private network.

In an embodiment, the user, e.g., an administrator, manages the on-prem resources (e.g., storage nodes via APIs) from the browser 350 within the customer's network 150. Illustratively, the browser 350 executes on the administrative node 170 located in the customer network 150 as protected behind the firewall 160, such that the CORS requests 330 can be rendered from the browser 350 to the storage nodes 200. A web interface embodied as the administrative UI resides on the administrator node 170 of the storage cluster to provide management functions accessible via an administration UI on the browser 350 using the CORS requests 330. CORS is an HTTP specification (e.g., https://www.w3.org/TR/2014/REC-cors-20140116/) that uses HTTP headers to instruct the browser 350 to allow the web application 310 running at one origin or domain (e.g., location X of cloud provider 110) to provide URLs for selecting resources from a server (e.g., the private IP address of storage node 200) at a different origin or domain than that serving the original request (i.e., domain of location X of the cloud provider 110). However, CORS is primarily intended for use on publicly reachable remote computing systems (i.e., web sites) and not on a private (customer) network protected by firewall 160, as a publicly-hosted web application would have no knowledge of the private networks accessible to a particular browser nor the resources that may exist on that private network which would not be verifiable by the browser using public certificates.

In an embodiment, the administrative UI may be created by hosting its corresponding UI assets, e.g., Hyper Text Markup Language (HTML) pages, Cascading Style Sheets (CSS), Java script code, etc., in the publicly reachable cloud provider 110 to thereby render updates immediately deployable. This arrangement facilitates deployment of new UI features and fixes at the discretion of the cloud provider (e.g., NetApp.com) without affecting critical data storage features and performance of the storage nodes 200. Illustratively, the UI assets are placed by the cloud provider 110 at an access-controlled web site that is publicly reachable to enable provision of UI updates to the client component 340 executing in the administrator's browser 350 as the updates are published, rather than relying on explicit customer determined (initiated) downloads to the administrator node 170 of the latest updates made available by the provider.

Typically, CORS is configured on a first server to communicate with the UI on a second server via a two-way trust relationship. However, the target storage nodes 200 of the storage cluster (hardware resources) may have unknown (and possibly changing) network addresses, e.g., private IP addresses, such as 192.168.0.x consistent with IETF RFC 1918, within the customer network 150 so that configuring a trust relationship is difficult. For example, no publicly verifiable certificates, e.g., secure sockets layer (SSL) certificates, validating the nodes 200 may be used for private IP addresses. As such, the technique herein employs CORS in a unique way to avoid these limitations.

According to the technique, the UI software resources are published at the cloud provider web site and are only accessible with correct certificates in the CORS request 330 originating from the browser 350 as instructed by software (e.g., HTML pages) provided from the cloud provider 110 and thereafter running behind the customer's firewall 160. Illustratively, one or more target storage nodes 200 of the cluster may be recorded at the cloud provider 110 (via outbound communication) and are known to the external web application 310 executing on the cloud provider 110. As a result, if the administrator selects one of the target nodes 200 of the cluster to make a CORS request 330 to the node, that request will fail unless it is sourced behind the customer's firewall 160. That is, the UI software resource from the provider web site may not provide URLs (i.e., instruct the browser 350) to access cross origin resources in the private network, because they cannot be verified via cryptographic certificates relying on public DNS services. Note that while the storage nodes employ internal web servers using HTTPS protocol for security, the primary security mechanism is that the communication occurs between the target storage node 200 and the administrator browser 350 executing the UI software behind the firewall 160. Note also that communication between the UI browser and target nodes does not require a virtual private network (VPN) or an encrypted tunnel to ensure security; running the UI software behind the firewall is sufficient to initiate CORS requests to the nodes.

In an embodiment, a configuration of the technique may include two servers (one in the cloud and one in the local storage cluster) and one client (administrator browser). A first (cloud) server executing on one or more computer nodes 120 of the cloud provider 110 serves the UI assets for one or more authenticated target nodes 200 of the storage cluster to the client administrator browser 350 in the customer network 150. A second server executing on the target storage nodes 200 only accepts/processes/receives CORS HTTP requests 330 from the administrator browser 350. Note that a substantial portion of the UI asset functionality provided by the cloud server is protected by authentication and encryption, i.e., a login prompt at the cloud initiates entering of a customer's credentials to establish a SSL tunnel for downloading of the UI assets, configured according to the private IP addresses of the nodes, to the client browser 350. Once the UI assets are loaded, the browser 350 may dynamically (i.e., on-the-fly) issue CORS requests 330 to the target nodes 200 based on the private IP addresses of the nodes (as provided by the customer) and based on invocation of CORS at the nodes. In contrast, the client UI browser of a conventional CORS deployment may expressly encode an IP address of a target node server to which it issues CORS HTTP requests. Notably, when the administrator authenticates (i.e., logs-in) with the cloud server, configuration information (e.g., the private IP address) of the administrative node 170 of the cluster is provided by the administrator (alternatively, the configuration information may be collected and provided automatically to the cloud server) so that the cloud server may configure the UI assets to be downloaded tailored to the customer's cluster configuration, including the private network.

In addition, because untrusted IP addresses (e.g., private IP addresses) or domains (i.e., lacking identity certificates signed by public certificate authorities) are shipped with self-signed certificates (since the nodes of those addresses/domains are used in a private customer network), CORS is fundamentally blocked by the client browser 350 unless the browser explicitly ignores or accepts the untrusted certificate warning, or is configured to accept the untrusted certificate. Accordingly, when a CORS request 330 to an IP address is anticipated to fail because of this untrusted self-signed certificate issue, the technique prompts the user (administrator) with information of an attempt to communicate with a hardware resource (i.e., storage node) that has a self-signed certificate and instructs the administrator to enable the client browser to accept the expected warning and to continue to attempt communication. The technique then redirects the browser to that (failed) IP address, which invokes a native browser prompt that warns the resource may be untrusted (i.e., the expected warning). The administrator may then accept that warning and a UI asset (Java script) on the client browser redirects the browser back to issuing the CORS request without error. In this manner, the technique guides the administrator through anticipated security warnings of the client browser with respect to the CORS request.

Figure 4:
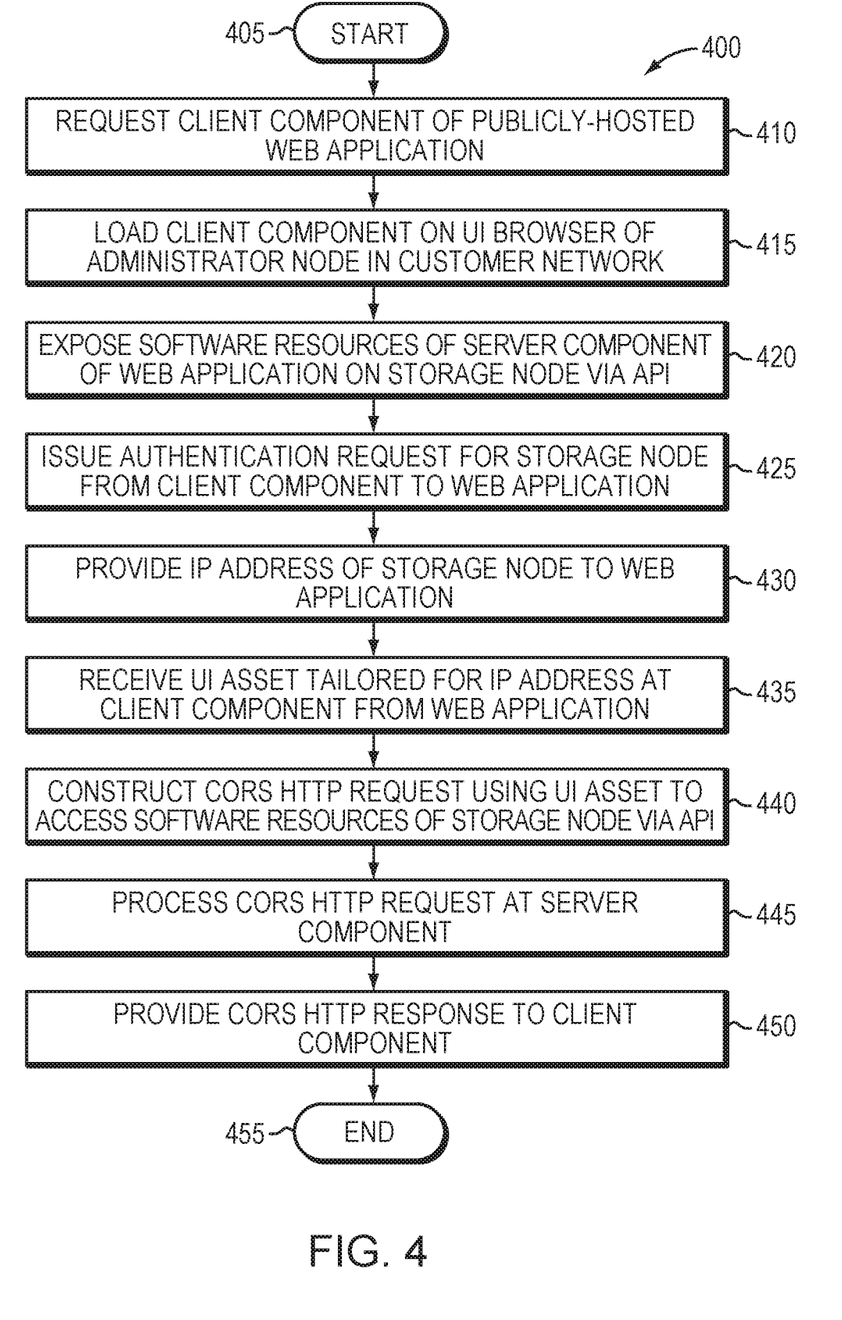
FIG. 4 illustrates an exemplary simplified procedure for implementing an administrative user interface of a backend service to manage and administer on-premises hardware resources, such storage nodes, within a private customer network.

FIG. 4 illustrates an exemplary simplified procedure 400 for implementing the administrative UI of the backend service to manage and administer on-prem hardware resources, such as a storage node, within the private customer network. The procedure starts at block 405 and proceeds to block 410 where the user (e.g., administrator) issues a request for the client component of the publicly hosted web application. At block 415, the client component is loaded on the UI browser of the administrator node within the customer network and, at block 420, the server component of the web application residing on the storage node exposes its software resources via the API. At block 425, the client component issues an authentication request for the storage node to the web application and, at block 430, provides a (private) IP address of the storage node. At block 435, the client component receives a UI asset from the web application tailored for the IP address and, at block 440, the client component of the UI browser constructs a CORS HTTP request to access the software resources of the storage node via the API. At block 445, the server component of the storage node processes the CORS HTTP request and, at block 450, provides a CORS HTTP response to the client component. The procedure then ends at block 455. Note that depending on its configuration, the browser may continue to issue a security warning for each access to the CORS HTTP request to the private IP address (i.e., lacking identification using certificates signed by public certificate authorities) or may place the private IP address on a whitelist corresponding to the self-signed certificate once the anticipated warning is accepted.

Advantageously, the technique described herein facilitates management and administration of on-prem hardware resources of a private data center in a secure manner, while leveraging the benefits of additional or enhanced software feature functionality provided through a publicly hosted web application executing in a cloud. Illustratively, the web application does not receive a request from a user/customer for access to the resources; instead a customer directs its browser to the publicly hosted web site, where is the web application executing on the web site authenticates the customer and on-prem resources and returns to the browser the enhanced software features as UI assets (HTML pages, Java script, CSS). These UI software assets are loaded on the administrative node of the customer network and are configured to locally access the resources using CORS based on a customer-provided private address for the local resources. This is the only interaction that the administrator's browser has with the external web application in the cloud. Once the UI software assets are loaded into the browser, subsequent CORS requests originate from the browser to the hardware resources (storage nodes) and not from the web application in the cloud. Essentially, the external web application in the cloud is used a vehicle for hosting and providing the UI assets to the administrator's browser. Although initiated by the UI, the CORS requests are orchestrated by the administrator's browser directly to the nodes, which includes guided prompts in anticipation of browser security warnings when accessing the private IP address unverifiable by public certificate authorities.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A system comprising:
a node of a private network, the node configured to execute a server component of a web application, the server component configured to expose resources of the node via an application programming interface (API); and
a backend service running on an administrator node of the private network, the backend service having an administrative user interface (UI) used to securely manage and administer the node from a client component of the web application configured to receive a UI asset from a cloud provider, the UI asset tailored by the cloud provider for a private network address of the node to construct a cross-origin request to the private network address of the node.

2. The system of claim 1 wherein the cross-origin request is a cross-origin resource sharing (CORS) request across a public location of the cloud provider and the private network address.

3. The system of claim 2 wherein the CORS request is used by the client component to manage and access the resources of the node via the API.

4. The system of claim 2 wherein the server component is further configured to accept the CORS request from a browser of the administrator node.

5. The system of claim 1 wherein the private network address is a private Internet Protocol address accessible to a browser of the administrator node.

6. The system of claim 1 wherein the private network address is a publicly reachable Internet Protocol version 6 address lacking a public domain name service record.

7. The system of claim 1, wherein the node comprises a storage node of a plurality of storage nodes organized as a storage cluster and wherein the backend service further comprises:
a browser configured to process the cross-origin requests among the storage node and the web application, the client component loaded on the browser and interacting with a firewall to enable the administrative UI to securely manage and administer on-premises resources within the private network.

8. The system of claim 7 wherein the UI asset comprises one of a Hyper Text Markup Language page, Cascading Style Sheet, and Java script code.

9. The system of claim 8 wherein the backend service comprises the browser configured to execute cross-origin resource sharing (CORS) requests among the plurality of storage nodes and the web application.

10. A method comprising:
receiving a client component of a web application on a user interface (UI) of a backend service running on an administrator node in a private network, the web application hosted at a public location on a remote computing system of a public network;
exposing software resources of a node residing in the private network via an application programming interface (API) of the node;
constructing a secure cross origin request at the client component using a UI asset tailored to a private address of the node;
issuing the secure cross origin request from the client component to the node to access the software resources via the API; and
providing a secure cross origin response from the server component to the client component.

11. The method of claim 10 further comprising:
issuing an authentication request for the node from the client component to the web application;
in response to the authentication request, providing the private address from the client component to the web application; and
configuring the web application according to the private address to provide for construction of the secure cross origin request at the client component.

12. The method of claim 11 further comprising:
receiving the UI asset tailored by the remote computing system for the private address from the web application at the client component.

13. The method of claim 10 wherein the secure cross origin request is a cross origin resource sharing (CORS) HyperText Transfer Protocol (HTTP) request.

14. The method of claim 13 further comprising:
executing a server component of the web application on the node; and
processing the CORS HTTP request using the server component of the node.

15. The method of claim 13 further comprising using the CORS HTTP request by the client component to manage and access the software resources of the node via the API.

16. The method of claim 13 wherein the server component is further configured to accept the CORS HTTP request from the public location.

17. The method of claim 10 wherein the private address is a publicly reachable Internet Protocol version 6 address lacking a public domain name service record.

18. The method of claim 10 wherein the private address is a private Internet Protocol address accessible to the UI.

19. The method of claim 10 wherein the UI asset comprises one of a Hyper Text Markup Language page, Cascading Style Sheet, and Java script code.

20. A system comprising:
a storage node of a private network, the storage node configured to execute a server component of a web application, the server component configured to expose software resources of the storage node via an application programming interface (API); and a backend service running on an administrator node of the private network, the backend service having a user interface (UI) used to securely manage and administer the storage node from a client component of the web application loaded on the browser, the client component configured to receive a network address of the storage node to construct a secure cross-origin resource sharing (CORS) request using a UI asset tailored to the network address of the storage node.

* * * * *